(12) United States Patent
Miyamoto et al.

(10) Patent No.: US 7,738,442 B2
(45) Date of Patent: Jun. 15, 2010

(54) COMMUNICATION CONTROL UNIT AND FILTERING METHOD IN COMMUNICATION CONTROL UNIT

(75) Inventors: Takashi Miyamoto, Yokohama (JP); Satoshi Kiyoto, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 971 days.

(21) Appl. No.: 11/074,686

(22) Filed: Mar. 9, 2005

(65) Prior Publication Data

US 2005/0232229 A1    Oct. 20, 2005

(30) Foreign Application Priority Data

Mar. 22, 2004   (JP)   ............................. 2004-082752

(51) Int. Cl.
   *H04L 12/28* (2006.01)
   *G06F 15/173* (2006.01)
(52) U.S. Cl. ..................... 370/351; 370/389; 370/395.1; 370/396; 370/400; 709/230; 709/223; 709/244; 340/870.01
(58) Field of Classification Search ................ 370/351, 370/389, 395.1, 395.5, 395.52, 395.61, 396, 370/401, 357, 360, 372, 386, 392, 400, 395.21; 379/211.01; 709/230, 223, 226, 227, 229, 709/238, 244; 348/143; 340/870.01; 713/201, 713/153

See application file for complete search history.

(56) References Cited

U.S. PATENT DOCUMENTS

| | | | |
|---|---|---|---|
| 7,046,680 B1 * | 5/2006 | McDysan et al. ............ 370/396 |
| 2002/0113874 A1 * | 8/2002 | Schlafer ..................... 348/143 |
| 2002/0167946 A1 | 11/2002 | Gallant | |
| 2004/0068574 A1 * | 4/2004 | Costa Requena et al. .... 709/230 |
| 2004/0170267 A1 * | 9/2004 | Seligmann ............. 379/211.01 |
| 2004/0250127 A1 * | 12/2004 | Scoredos et al. ............ 713/201 |

FOREIGN PATENT DOCUMENTS

| | | |
|---|---|---|
| JP | 03-052055 | 6/1991 |
| JP | 06-090479 | 3/1994 |
| JP | 08-251231 | 9/1996 |
| JP | 2002-016952 | 1/2002 |
| JP | 2002-232453 | 8/2002 |
| JP | 2002-314577 | 10/2002 |
| JP | 2003-087327 | 3/2003 |
| JP | 2003-263391 | 9/2003 |
| JP | 2003-324524 | 11/2003 |

* cited by examiner

*Primary Examiner*—Aung S Moe
*Assistant Examiner*—Jamal Javaid
(74) *Attorney, Agent, or Firm*—Antonelli, Terry, Stout & Kraus, LLP.

(57) ABSTRACT

Origination and incoming are regulated for each service in user units. An origination filter table stores contract service information indicating whether or not each service can be used and the maximum number of sessions that can be activated by the originator corresponding to each originator identifier (for example, SIP-URI). An incoming filter table stores incoming enable/refusal information and an originator identifier from which incoming is enabled or refused corresponding to each receiver identifier. A communication control section references the contract service information and the maximum number of sessions in the origination filter table based on the originator identifier in the message received from a communication terminal, determines whether or not the service indicated by service type information in the message can be used, and determines whether or not a new session can be established. The communication control section references the incoming enable/refusal information in the incoming filter table based on the receipt party and originator identifiers in the message and determines whether or not incoming is enabled.

10 Claims, 10 Drawing Sheets

COMMUNICATION CONTROL UNIT AND FILTERING METHOD IN COMMUNICATION CONTROL UNIT

BACKGROUND OF THE INVENTION

This invention relates to a communication control unit and a filtering method in a communication control unit and in particular to a communication control unit and a filtering method for controlling the start, end, and change of an interactive communication session as a control function of a plurality of communication terminals for each unit (domain) of an IP (Internet Protocol) network formed by connecting communication terminals in conformity with the Internet protocol to a LAN.

Demand for a communication control unit rises steadily from integration of an intracorporate communication infrastructure into an IP base and the rise of VoIP (Voice over IP). Malicious calls and an increase in traffic load are easily possible problems and a technique of regulating them (filtering) is a surely important function.

In the filtering in the current IP communications, first a filtering system based on filtering considering originator/receipt party as one set is known. That is, it is a system for refusing a message from an originator with an undesired incoming with the receipt party as the subject. In the system in the related art, for example, the originator IP address and receipt party IP address information is referenced from the header part of the received IP packet and a filter table is searched for entries and if the corresponding entry is found, the IP packet is discarded (or is passed through).

However, the filter table involves a problem of being incapable of setting based on time specification. JP-2002-232453 discloses an Internet protocol filtering apparatus, etc., for making it possible to control an IP packet flow in a network for each predetermined time by setting an entry in a filter table so as to apply filtering only within a specific time. (For example, refer to JP-A-2002-232453.)

Second, a filtering system for regulating messages from other than registered users is known. Whether or not the user is a registered user is determined by the identifier for uniquely indicating the user (for example, identifier of IP address, etc.). For example, "an inter-terminal communication connection control method using an IP transfer network" for performing IP packet filtering is disclosed wherein an address management table is provided in a communication control unit and only an IP packet with a pair of IP address and port number registered in the table is allowed to pass through. (For example, refer to JP-A-2002-314577.) As is obvious from the description given above, as the filtering methods in the related arts, IP and transport layer filtering techniques are general.

A system for also enabling a receipt party to set filtering as a client function is disclosed. (For example, refer to JP-A-8-251231.) A document describes unsolicited bulk e-mail filtering for stopping mail service distribution based on the mail address of the user transmitting more than a predetermined number of pieces of mail if mail is transmitted to an indefinite number of persons indiscriminately or in large quantity. (For example, refer to JP-A-2003-87327.) A system is also disclosed wherein URLs and telephone numbers in unsolicited bulk e-mail text are extracted for storage and whether or not mail sent to the mail user contains any of the stored URLs and telephone numbers is determined, whereby unsolicited bulk e-mail can be filtered if the mail address of the destination is changed. (For example, refer to JP-A-2003-263391.) A system for performing session open control in accordance with the number of sessions that can be opened for each group concerning TSS (time sharing system) sessions is disclosed. (For example, refer to JP-A-3-52055.)

SUMMARY OF THE INVENTION

In the first filtering system described above, entries of originator/receipt party sets are registered in large quantity. For example, considering that the number of users is 40000, the number of entries may reach 40000×39999 as simple calculation. Although the search processing is performed using a computer, the processing is slowed and management conducted by operators (persons) becomes intricate. For example, the operator adds, deletes, etc., entries and therefore the larger the quantity, the wider the setting mistake influence range. If a receipt party who does not like any message from an unexpected originator and wants to communicate only with a limited small number of users exists, to deal with the case using the filtering system described above, the number of entries becomes too large and thus management conducted by persons becomes furthermore intricate.

In the first filtering system described above, the operator of the communication control unit having the filtering system sets filtering; if the receipt party is the subject, it is better to also enable the receipt party to set filtering. JP-A-8-251231 discloses the system for also enabling a receipt party to set filtering, but it is the client function and a system for a server to receive a filtering setting request and perform processing is not shown. The arts described in JP-A-2002-232453 and JP-A-2002-314577 cannot deal with the problems.

In the second filtering system described above, to use the second filtering system with a communication control unit that can provide various types of services, the registered user would be able to use all services. It is impossible to flexibly handle the users in such a manner that one user can use one service, but not another service. If it is possible to flexibly handle the users in such a manner, clearly traffic load reduction and processing load reduction on the communication control unit can be expected as compared with the second filtering system.

Further, in communications using SIP (Session Initiation Protocol), it may be necessary to regulate the number of simultaneous sessions from the same originator in response to the contract.

The filtering in the related arts is often based on the IP address. In this case, it can be thought of as filtering in units of the IP addresses, namely, "user-used machines." Since the service is used by the "user" rather than "machine," it is essential that origination/incoming filtering in the communication service be performed in the user units. Further, the systems in the related arts cannot deal with the problems in an environment in which the IP address dynamically changes such as a mobile environment. In the unsolicited bulk e-mail filtering as shown in JP-A-2003-87327, filtering is realized based on the mail address, but is only filtering in one specific service of "mail service." The unsolicited bulk e-mail filtering shown in JP-A-2003-263391 is applied to the user-used machines involving the URLs and the telephone numbers.

In the view of above, it is therefore an object of the invention to provide a communication control unit and a filtering method for enabling only a specific service function to be provided for each end user when a common carrier provides the end users with a plurality of services. It is another object of the invention to make it possible to further lighten the traffic load and the processing load on a communication control unit by adopting origination filtering and incoming filtering. It is another object of the invention to provide a communication control unit and a filtering method for filtering in an application layer and filtering a message in user units. It is another object of the invention to filter based on the number of simultaneous sessions in a communication control unit using SIP as a protocol. It is another object of the invention to make it possible to collectively control establishing of a session in an SIP server for controlling logical resources of sessions on the Internet.

It is another object of the invention to provide a communication control unit and a filtering method for enabling a human being to conduct easy management with an incoming filtering table made up of entries each for each receipt party. It is another object of the invention to make it possible to reduce the number of entries of an incoming filtering table even if a receipt party who does not like any message from an unexpected originator and wants to communicate only with a limited small number of users exists. It is another object of the invention to enable the user to set an incoming filtering table.

To solve the problem of the first filtering system described above, an incoming filtering system is provided wherein the main key of an incoming filtering table is only the identifier of the receipt party, an incoming enable/refusal determination column is provided, and an originator from whom incoming is enabled or refused is described in the subsequent column. When a message to set in a filtering table by the user is received in a communication control unit having the incoming filtering system, registration processing in the incoming filtering table is added. As the above-mentioned entry is implemented as information in a message header in an application layer, filtering can be conducted in the application layer rather than filtering in an IP/transport layer in related arts. Accordingly, filtering can be conducted in user units rather than in units of the IP addresses, namely, "user-used machines."

To solve the problem of the second filtering system described above, an origination filtering system is provided wherein even the registered user is restricted for each service by providing a use enable/disable determination column of each service in an origination filter table. As the above-mentioned entry is implemented as information in a message header in an application layer, filtering can be conducted in the application layer rather than filtering in an IP/transport layer in the related arts.

According to the first solving means of this invention, there is provided a communication control unit using SIP (Session Initiation Protocol) as a protocol in an IP network where a plurality of communication terminals are connected for controlling a session of interactive communications between the plurality of communication terminals and providing a plurality of services by the single unit, said communication control unit comprising:

an origination filter table previously storing contract service information indicating whether or not each originator can use each of plurality of services and information of maximum number of session that can be established by the originator, corresponding to each originator SIP-URI (SIP-Uniform Resource Identifier) to identify an origination user;

an incoming filter table previously storing incoming enable/refusal information indicating whether incoming is enabled or refused and one or plurality of originator SIP-URI(s) to identify the originator from whom incoming is enabled or refused in accordance with the incoming enable/refusal information, corresponding to each receiver SIP-URI to identify an incoming user;

a position information table storing address information of the destination communication terminal corresponding to each receiver SIP-URI; and a communication control section for referencing said origination filter table and said incoming filter table, and filtering a message received from each communication terminal, wherein said communication control section receives a message including the originator SIP-URI, the receiver SIP-URI, and service type information responsive to the used service from one of the communication terminals, references said origination filter table based on the originator SIP-URI included in the received message, determines whether or not the originator can use the service indicated by the service type information included in the message in accordance with the contract service information corresponding to the originator SIP-URI, and compares between the information of maximum number of sessions corresponding to the originator SIP-URI and the number of sessions already established by the originator to determine whether or not a new session can be established, references said incoming filter table based on the receiver SIP-URI and the originator SIP-URI included in the received message, and determines whether or not incoming from the originator to the receiver is enabled in accordance with the incoming enable/refusal information corresponding to the receiver SIP-URI and the originator SIP-URI, references said position information table based on the receiver SIP-URI included in the received message, and acquires the address information corresponding to the receiver SIP-URI, and transmits the received message to the communication terminal of the receiver based on the acquired address information or discards the received message, in accordance with the determination results as to whether the service can be used or not, a new session can be established or not, and the incoming is enabled or not.

According to the second solving means of this invention, there is provided a filtering method in a communication control unit using SIP (Session Initiation Protocol) as a protocol in an IP network where a plurality of communication terminals are connected for controlling a session of interactive communications between the plurality of communication terminals and providing a plurality of services by the single unit, said filtering method includes:

receiving a message including an originator SIP-URI (SIP-Uniform Resource Identifier), a receiver SIP-URI, and service type information responsive to the used service from one of the communication terminals, referencing an origination filter table previously storing contract service information indicating whether or not each originator can use each of plurality of services and information of maximum number of session that can be established by the originator, corresponding to each originator SIP-URI to identify an origination user based on the originator SIP-URI included in the received message, determining whether or not the originator can use the service indicated by the service type information included in the message in accordance with the contract service information corresponding to the originator SIP-URI, and comparing between the information of maximum number of sessions corresponding to the originator SIP-URI and the number of sessions already established by the originator to determine whether or not a new session can be established, referencing an incoming filter table previously storing incoming enable/refusal information indicating whether incoming is enabled or refused and one or plurality of originator SIP-URI (s) to identify the originator from whom incoming is enabled or refused in accordance with the incoming enable/refusal information, corresponding to each receiver SIP-URI to identify an incoming user based on the receiver SIP-URI and the originator SIP-URI included in the received message, and determining whether or not incoming from the originator to the receiver is enabled in accordance with the incoming enable/refusal information corresponding to the receiver SIP-URI and the originator SIP-URI, referencing a position information table storing address information of the destination communication terminal corresponding to each receiver SIP-URI based on the receiver SIP-URI included in the received message, and acquires the address information corresponding to the receiver SIP-URI, and transmitting the received message to the communication terminal of the receiver based on the acquired address information or discarding the message, in accordance with the determination results as to whether the service can be used or not, a new session can be established or not, and the incoming is enabled or not.

According to the invention, one entry is provided for one receipt party, so that a communication control unit for enabling a human being to conduct easy management can be provided as compared with a communication control unit wherein the correspondence between receipt party and originator is registered as one entry. According to the invention, it is also made possible to reduce the number of entries for a receipt party who does not like any message from an unexpected originator and wants to communicate only with a limited small number of users. Further, the invention enables the user to set the incoming filtering table.

According to the origination filtering system of the invention, when a common carrier uses a communication control unit having the origination filtering system of the invention to provide a plurality of services for the end users, the service can be provided matching the cost situation for each end user in such a manner that only a specific service function is provided. Further, according to the invention, it is made possible to further lighten the traffic load and the processing load on the communication control unit.

According to the invention, a communication control unit and a filtering method for filtering in an application layer and filtering a message in user units can be provided. According to the invention, filtering can be conducted based on the number of simultaneous sessions in a communication control unit using SIP as a protocol. According to the invention, it is made possible to collectively control establishing of a session in an SIP server for controlling logical resources of sessions on the Internet.

In the incoming filtering system and the origination filtering system of the invention, incoming and origination filtering tables can be created from SIP header information, whereby filtering in the SIP layer (application layer) is possible. Accordingly, filtering can be conducted in user units rather than in units of the IP addresses, namely, "user-used machines." According to the invention, even if the user uses a plurality of machines, entry update in the filtering table is not required and a mobile environment, etc., in which the IP address of the machine dynamically changes can also be handled.

DETAILED DESCRIPTION OF THE PREFERRED EMBODIMENTS

Referring now to the accompanying drawings, there is shown a preferred embodiment of the invention.

In an embodiment of the invention, a communication mode using SIP is used. In the SIP, an identifier called SIP-URI (SIP-Uniform Resource Identifier) is given for each communication terminal user. The SIP-URI is represented as sip: User@test.com, for example.

Figure 1:
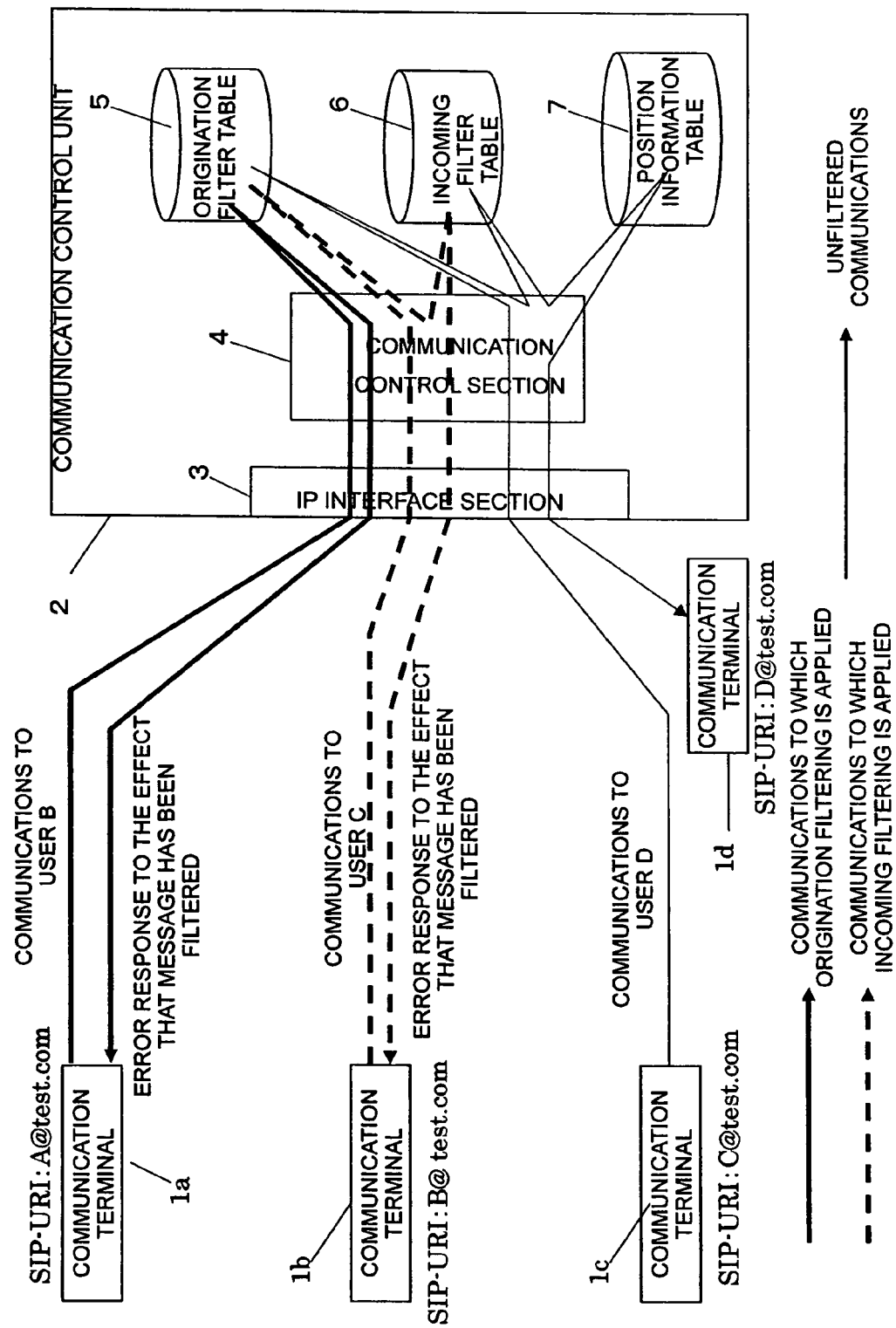
FIG. 1 is a drawing to show the general configuration of a system of the embodiment.

FIG. 1 is a drawing to show the general configuration of a system of the embodiment. A communication control unit 2 includes an IP interface section 3, a communication control section 4, an origination filter table 5, an incoming filter table 6, and a position information table 7. A plurality of communication terminals 1 are connected to the IP interface section 3 of the communication control unit 2 (SIP server) through an IP network. The communication control unit 2 is provided for the plurality of communication terminals to communicate with each other.

In the embodiment, two types of filtering systems are shown. One is an origination filtering system for conducting communication use regulation of originators, which will be hereinafter referred to as filtering. The communication control unit 2 references the entries of the origination filter table 5 and determines whether or not communications are enabled. The other is an incoming filtering system for filtering based on an originator/receipt party combination. The communication control unit 2 references the entries of the incoming filter table 6 and determines whether or not communications are enabled (narrow line in FIG. 1).

An outline of a communication flow between the communication terminals 1 will be discussed. First, a flow of unfiltered communications will be discussed.

When the originating communication terminal 1 (for example, terminal 1c) transmits a message to another communication terminal 1 (for example, terminal 1d), first the communication control unit 2 receives the message through the IP interface section 3. The message is passed to the communication control section 4, which then references the origination filter table 5, the incoming filter table 6, and the position information table 7.

If the origination filter table 5 does not contain the filtering entry of the communication terminal 1b user and the incoming filter table 6 does not contain the filtering entry of communications from the communication terminal 1c user to the communication terminal 1d user, the communication control section 4 solves the IP address with the position information table 7 from the SIP-URI (D@test.com) of the communication terminal 1d user, and sends the message to the destination communication terminal 1d.

The position information table 7 is provided for solving the address of a communication terminal; in the embodiment, it is a table for solving the IP address from SIP-URI, for example. The position information table 7 is similar to that in related arts, but is shown in the figure for convenience of the description.

Next, an outline of a flow of filtered communications will be discussed.

For example, when a communication terminal 1a transmits a message to a communication terminal 1b, the communication control section 4 of the communication control unit 2 receives the message and references the origination filter table 5 in a similar manner to that described above. If the origination filter table 5 contains the filtering entry of the communication terminal 1a user, the communication control unit 2 discards the message and the message does not reach the communication terminal 1b (origination filtering, solid line in FIG. 1). The communication control unit 2 notifies the communication terminal 1a that the message has been filtered.

For example, when the communication terminal 1b transmits a message to the communication terminal 1c, the communication control section 4 receives the message and references the origination filter table 5 in a similar manner to that described above. If the origination filter table 5 does not contain the filtering entry of the communication terminal 1b user, then the communication control unit 2 references the incoming filter table 6. If the incoming filter table 6 contains the filtering entry of communication refusal from the communication terminal 1b to the communication terminal 1c (or does not contain the communication enable entry), the communication control unit 2 discards the message and the message does not reach the communication terminal 1c (incoming filtering, dashed line in FIG. 1). The communication control unit 2 notifies the communication terminal 1b that the message has been filtered.

The processing flow has been briefly described and will be discussed later in detail.

Figure 2:
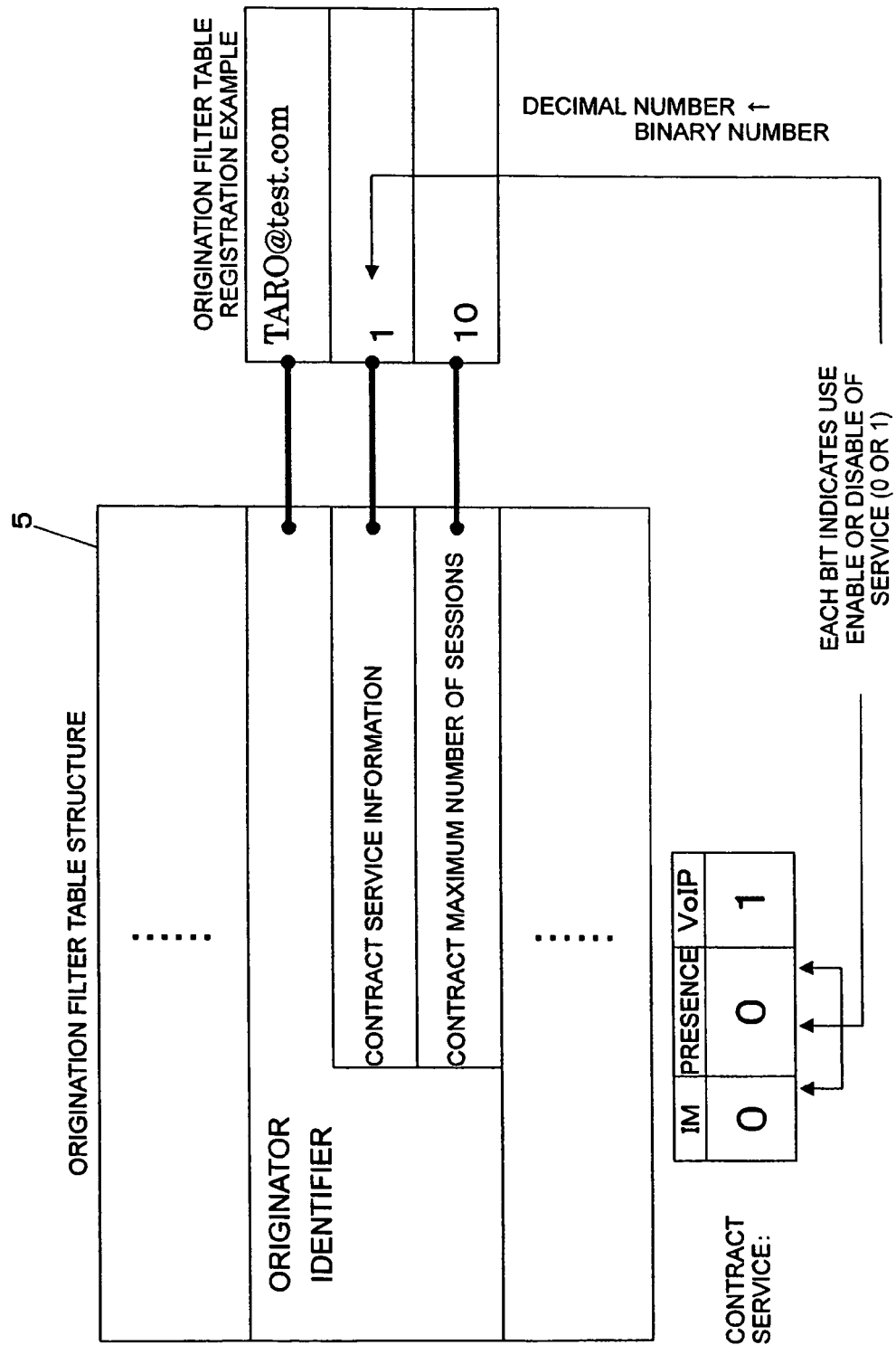
FIG. 2 is a drawing to show the structure of the origination filter table and a data registration example therein.

FIG. 2 is a drawing to show the structure of the origination filter table 5 and a data registration example therein. The origination filter table 5 is a table referenced when origination filter is performed. The origination filter table 5 is a table having contract service information and the contract maximum number of sessions as columns corresponding to each originator identifier. The originator identifier column is an identifier uniquely representing the originator; in the embodiment, it indicates the SIP-URI.

The contract service information column is classification of services that can be and cannot be used by the user. As shown in FIG. 2, each bit in binary number (0 or 1) represents use enable or disable of the service. For example, in the embodiment, "1" indicates use enable and "0" indicates use disable. The decimal value into which the binary number of the bit list indicating use enable/disable of each service is converted is previously registered in the table. Assuming that, for example, the communication control unit 2 provides the three services of VoIP (Voice over IP: IP voice conversation) service, presence service (the state of the associated user can be known), and IM (Instant Message: Transfer of simple message) service, the first bit, the second bit, and the third bit of the binary number in the contract service information column correspond to the VoIP service, the presence service, and the IM service respectively. For example, when the user whose SIR-URI is TARO@test.com can use only the VoIP service, decimal number "$1_{(10)}$" into which "$001_{(2)}$" is converted is previously registered in the contract service information column.

The contract maximum number of sessions column indicates the maximum number of sessions that can be activated at a time by the user. It does not involve classification for each service and indicates the total number of sessions. The number of sessions responsive to the contract with the user is previously registered.

Figure 3:
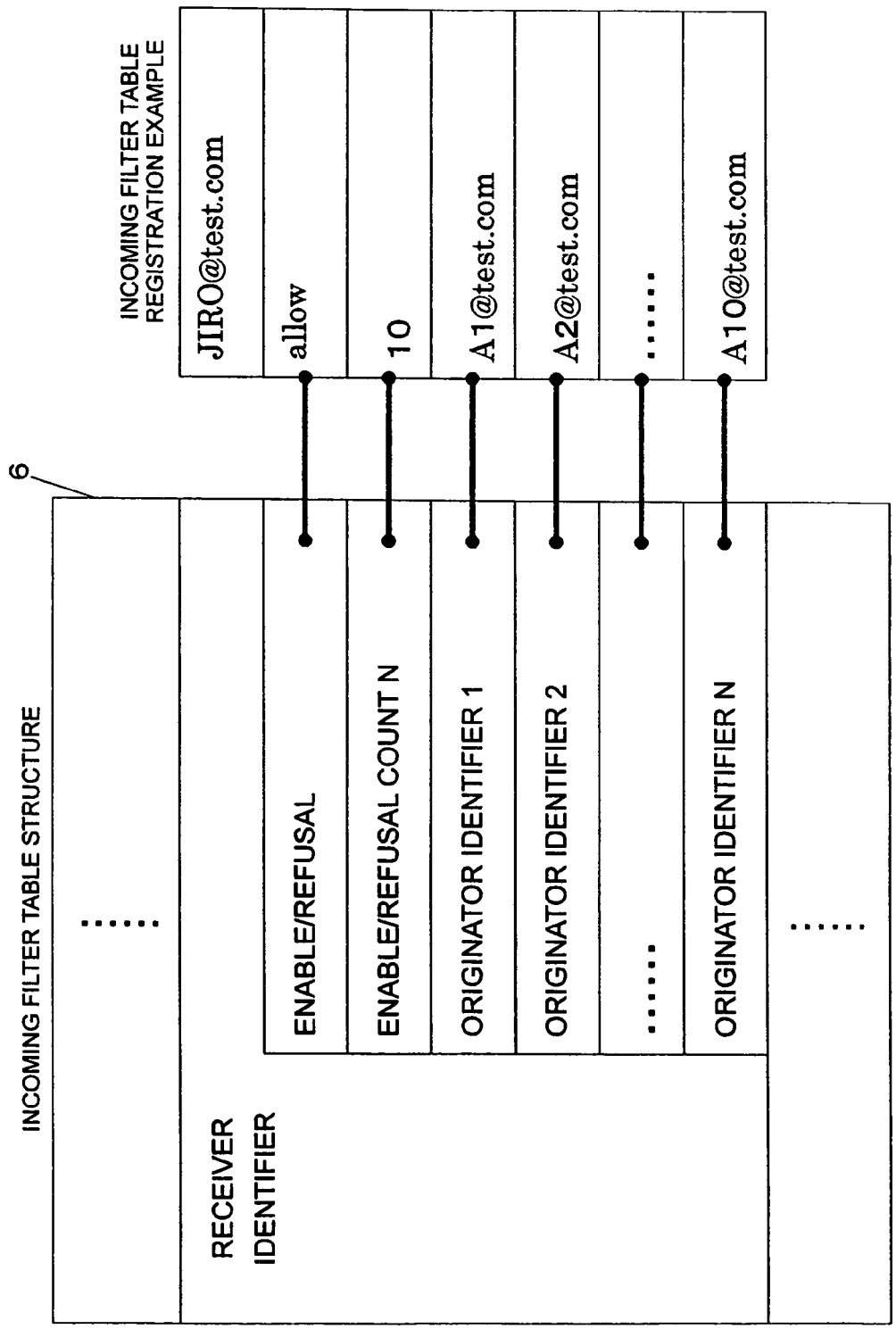
FIG. 3 is a drawing to show the structure of the incoming filter table and a data registration example therein.

FIG. 3 is a drawing to show the structure of the incoming filter table 6 and a data registration example therein. The incoming filter table 6 is a table referenced when incoming filter is performed. The incoming filter table 6 has enable/refusal information (incoming enable/refusal information), enable/refusal count N, originator identifier 1, originator identifier 2, . . . , originator identifier N as columns corresponding to each receiver identifier. The receiver identifier column is an identifier uniquely representing the receipt party; in the embodiment, it indicates the SIP-URI.

The enable/refusal information column indicates whether the receipt party enables or refuses message incoming from the originator stored in each originator identifier column. For example, if the receipt party enables incoming, "allow" can be entered; if the receipt party refuses incoming, "deny" can be entered. In addition, appropriate information, identifier, etc., indicating enable or refusal can also be used. The originator whose incoming is enabled/refused is specified in the subsequent originator identifier column.

The enable/refusal count N column represents the number of enabled/refused originators. If "allow" is specified in the enable/refusal information column, the enable/refusal count N column represents the number of originators whose incoming is enabled; if "deny" is specified, the enable/refusal count N column represents the number of originators whose incoming is refused.

The SIP-URIs of as many originators as the number specified in the enable/refusal count N column are previously registered in the originator identifier 1 column, the originator identifier 2 column, . . . , the originator identifier N column. If the value of the enable/refusal count N column is 10, 10 originator identifiers are specified. Originator identifier addition, deletion, or change can also be executed by receiving a registration message from a terminal.

Figure 4:
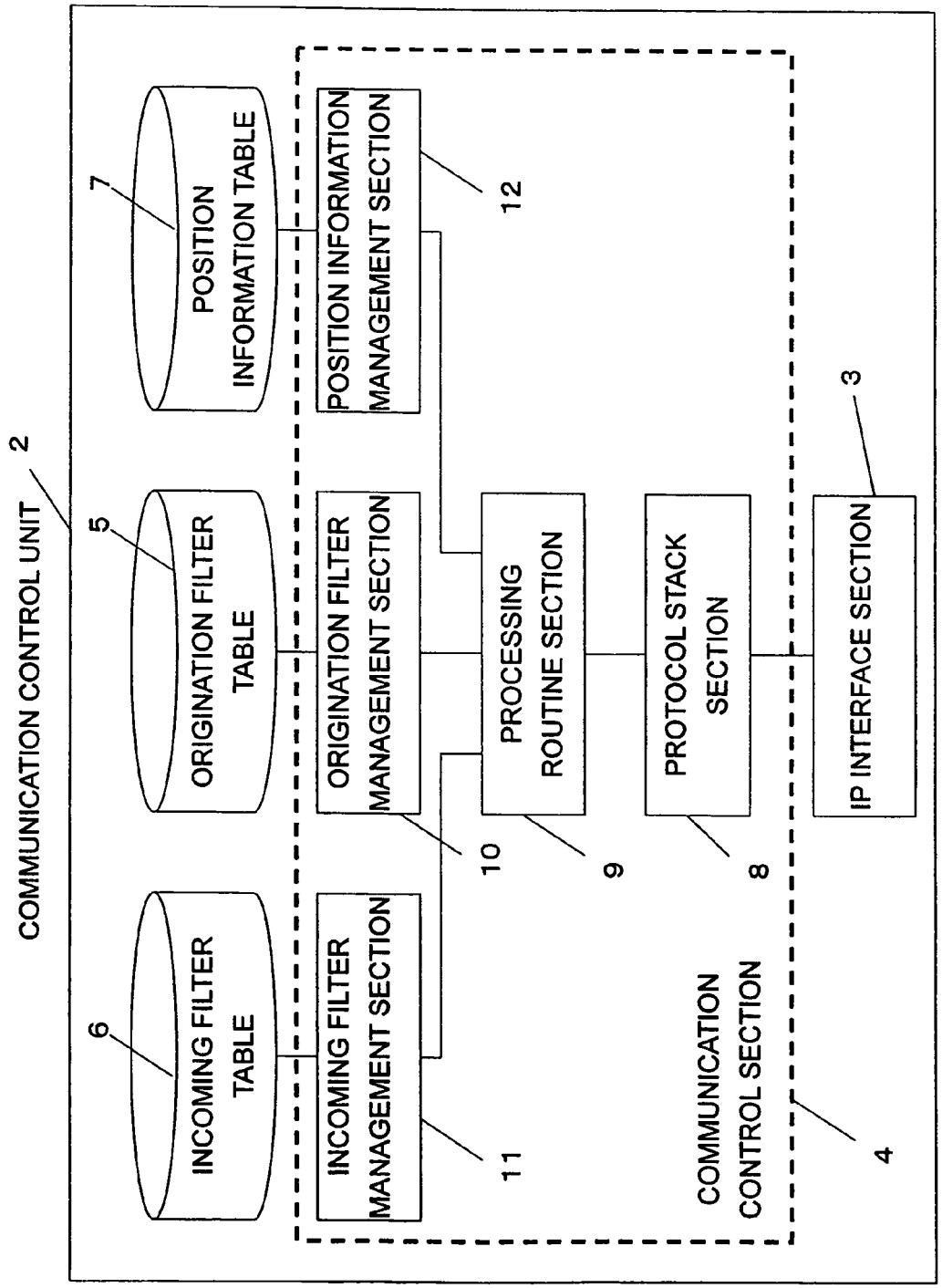
FIG. 4 is a block diagram of a communication control unit.

FIG. 4 is a block diagram of the communication control unit 2. The configuration of the communication control unit 2 having an origination filtering function and an incoming filtering function will be discussed with reference to FIG. 4.

The IP interface section 3 is a section for receiving a message (IP packet) from each communication terminal 1 and is a section for transmitting a message (IP packet) to each communication terminal 1.

The communication control section 4 has a protocol stack section 8, a processing routine section 9, an origination filter management section 10, an incoming filter management section 11, and a position information management section 12. In the embodiment, the protocol stack section 8, which is an SIP protocol stack, controls communications in conformity with the SIP protocol. The processing routine section 9 determines a predetermined processing scenario in response to the received message method (for example, REGISTER, SUBSCRIBE, INVITE, etc.), and instructs the origination filter management section 10, the incoming filter management section 11, and the position information management section 12 to perform filtering processing.

The origination filter management section 10 references the origination filter table 5 and returns the reference result to the processing routine section 9. The incoming filter management section 11 references the incoming filter table 6 and returns the reference result to the processing routine section 9. The position information management section 12 references the position information table 7, solves the address, and returns the result to the processing routine section 9. As the position information management section 12, a device similar to that in related arts can be used as with the position information table 7 and therefore the position information management section 12 will not be discussed in detail.

The origination filter table 5, the incoming filter table 6, and the position information table 7 are as described above.

Figure 5:
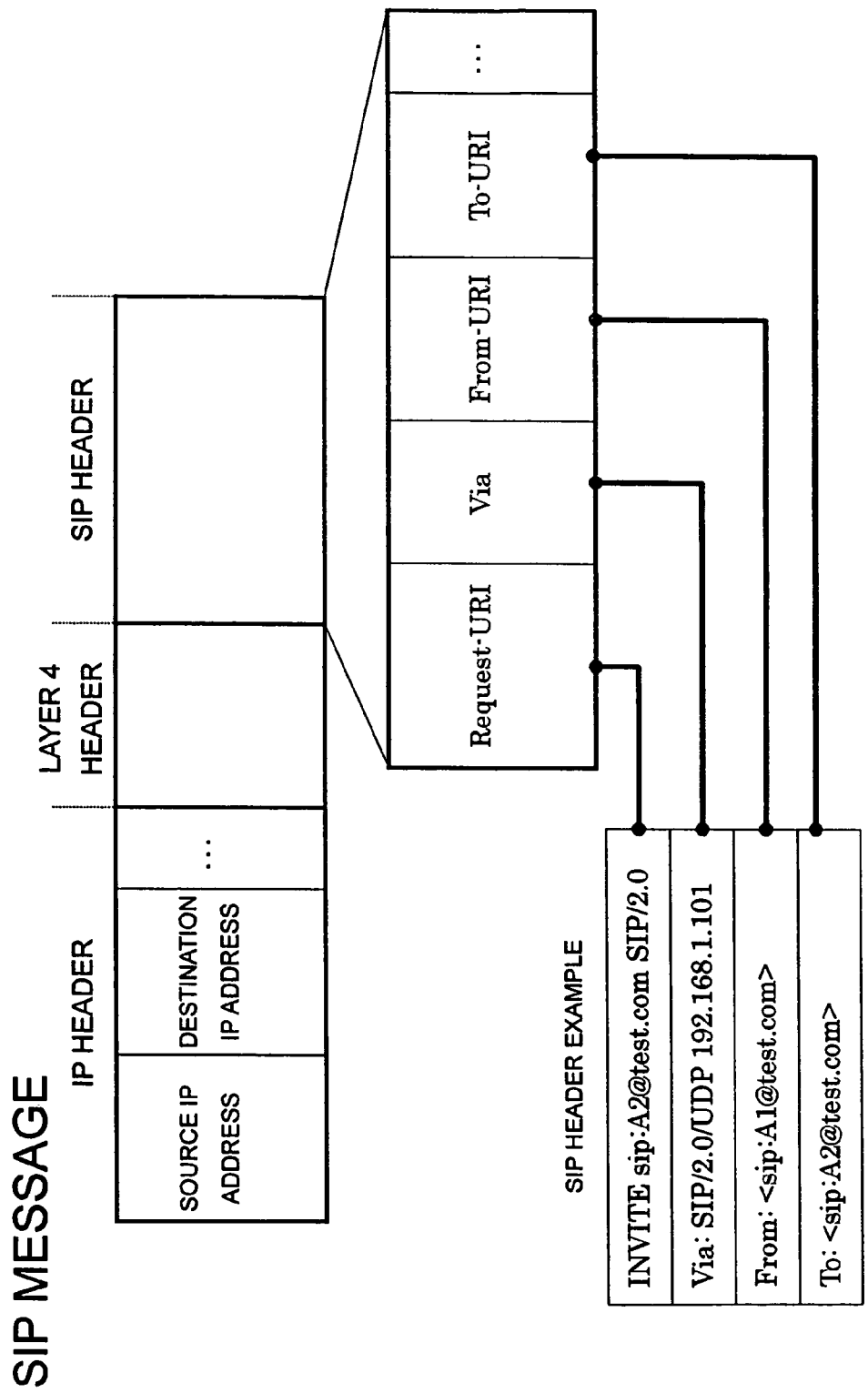
FIG. 5 is a drawing to show a structure example of a communication packet.

FIG. 5 is a schematic representation of the header configuration of a message in the embodiment. In the embodiment, the communication terminals 1 communicate with each other according to the SIP and thus each message has an IP header, a layer 4 header, and an SIP header. In the embodiment, filtering is performed based on SIP header information. In the SIP header information, Request-URI, To-header, and From-header are referenced. As shown in the figure, Request-URI is described as "INVITE sip:A2@test.com," for example, and information of the message type ("INVITE") is provided. As shown in the figure, To-header is described as "<sip: A2@test.com>," for example, and information of the receipt party SIP-URI is provided. As shown in the figure, From-header is described as "<sip:A1@test.com>," for example, and information of the originator SIP-URI is provided.

Figure 6:
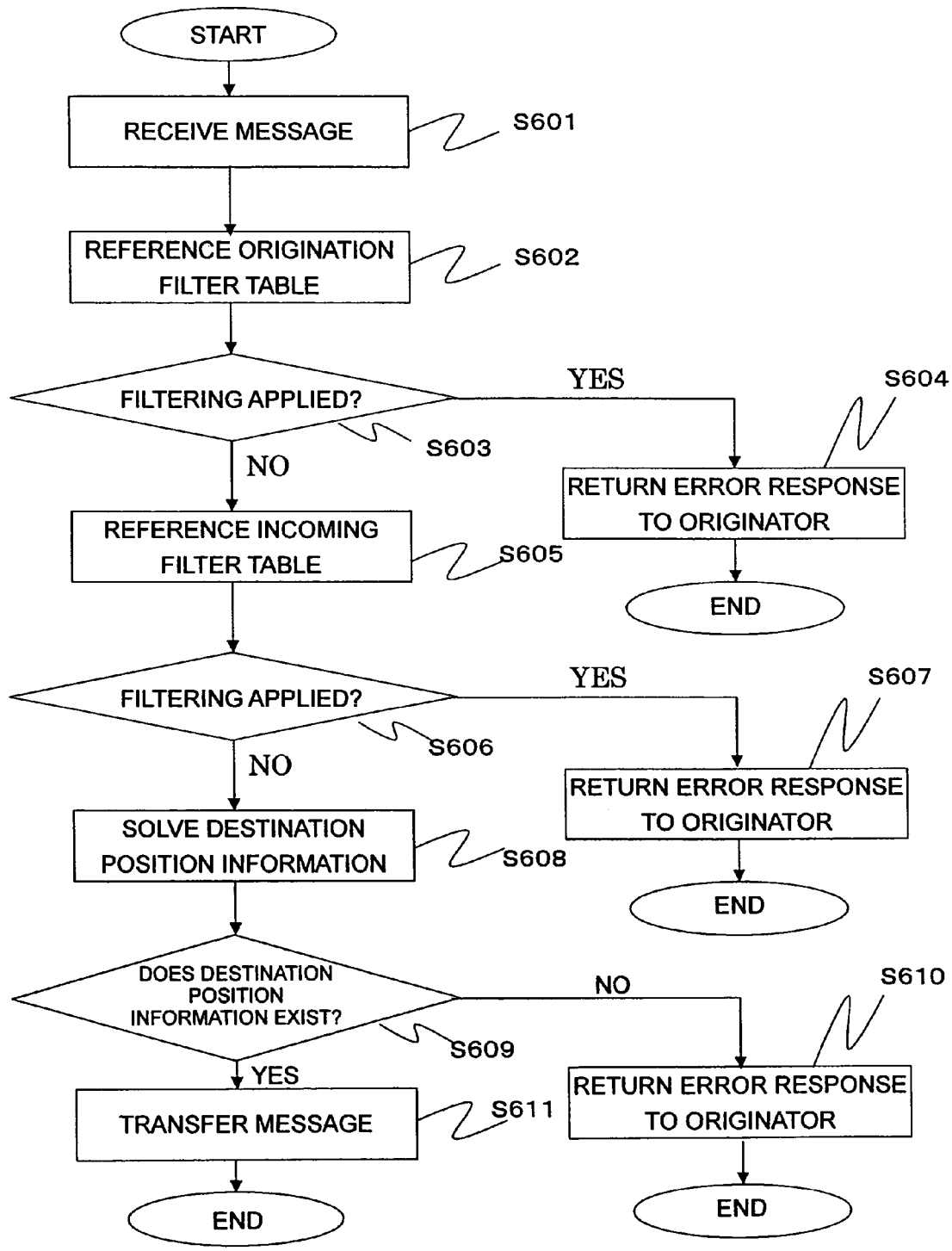
FIG. 6 is a flowchart of origination filtering and incoming filtering.

FIG. 6 is a flowchart of origination filtering and incoming filtering. A processing flow from reception of a message to transmission of the message will be discussed with reference to FIG. 6.

To begin with, when a message is transmitted from one communication terminal 1, the communication control section 4 of the communication control unit 2 receives the message through the IP network and the IP interface section 3 (S601). In the description that follows, at the time, it is assumed, for example, that the communication terminal 1 uses the VoIP service and that the SIP header of the message is Request-URI: INVITE JIRO@test.com, From: sip: TARO@test.com, To: sip:JIRO@test.com. For example, the communication control section 4 analyzes the received message and extracts the predetermined information.

Next, the processing routine section 9 recognizes the message through the protocol stack section 8 and instructs the origination filter management section 10 to reference the origination filter table 5 (S602). The origination filter management section 10 references the origination filter table 5 with From-header as a search key and determines whether or not the origination filter table 5 contains an entry filtering INVITE transmission of sip:TARO@test.com (S603). For example, the origination filter management section 10 searches the originator identifier columns for the originator identifier indicated by From-header, acquires the contract service information corresponding to the corresponding originator identifier, and determines whether or not the acquired contract service information indicates that the VoIP service can be used. That is, if the acquired contract service information is any of "1, 3, 5, or 7" (any of binary values whose first bit is 1) indicating VoIP use enable, the origination filter management section 10 determines origination enable; on the other hand, if the contract service information is not "1, 3, 5, or 7" or the originator identifier is not found, the origination filter management section 10 determines origination disable. The origination filter management section 10 returns the determination result to the processing routine section 9.

By the way, use enable/disable of the VoIP service, that of the presence service, and that of the IM service are registered in the contract service information in the origination filter table 5, as described above. Here, in the VoIP service, an INVITE message needs to be transmitted for establishing a session, in the presence service, a SUBSCRIBE message needs to be transmitted for establishing a session, and in the IM service, a MESSAGE message is transferred. Thus, in the embodiment, it is considered that origination filtering of the VoIP service, the presence service, or the IM service is equivalent to origination filtering of the INVITE message, the SUBSCRIBE message, or the MESSAGE message. In the embodiment, the three types of messages are determined based on Request-URI of the SIP header and filtering is performed.

The communication control section 4 can also perform origination filtering based on the number of sessions. For example, the communication control section 4 references the origination filter table 5 based on the originator identifier contained in the received message and acquires the information of maximum number of sessions corresponding to the originator identifier. If the number of sessions established by the originator is equal to the acquired maximum number of sessions or if the number of sessions established by the originator exceeds the acquired maximum number of sessions as the originator activates a new session, the communication control section 4 determines origination disable. The communication control section 4 can determine origination disable regardless of the determination result made according to the contract service information described above.

If the origination filter management section 10 determines origination disable (S603), the communication control unit 2 transmits an error response to sip:TARO@test.com, namely, the originator communication terminal 1 (S604). The communication control unit 2 discards the message and terminates the processing. On the other hand, if origination is enabled (S603), then the incoming filter management section 11 references the incoming filter table 6 (S605). After the processing termination of the origination filter management section 10, the processing routine section 9 can manage the processing flow for causing the incoming filter management section 11 to start processing, etc.

Next, the incoming filter management section 11 references the incoming filter table 6 with To-header as a search key and determines whether or not the incoming filter table 6 contains an entry filtering message incoming from sip: TARO@test.com to sip:JIRO@test.com (S606). For example, the incoming filter management section 11 searches the receiver identifier columns for the receiver identifier indicated by To-header. The incoming filter management section 11 searches the originator identifiers 1 to N corresponding to the found receiver identifier for the originator identifier indicated by From-header. If the corresponding entry is found, the incoming filter management section 11 determines incoming enable or refusal according to the enable/refusal information corresponding to the found receiver identifier. On the other hand, if the corresponding entry is not found, the incoming filter management section 11 makes a determination opposite to the enable/refusal information corresponding to the found receiver identifier. The incoming filter management section 11 returns the determination result to the processing routine section 9.

If the determination result of the incoming filter management section 11 indicates incoming refusal (S606), the communication control unit 2 transmits an error response to sip:

TARO@test.com, namely, the originator communication terminal 1 (S607). The communication control unit 2 discards the message and terminates the processing. On the other hand, if the determination result indicates incoming enable (S606), the position information management section 12 references the position information table 7 and solves the destination IP address from To-header (S608). For example, the position information management section 12 acquires the IP address corresponding to the SIP address in To-header from the position information table 7.

If the position information table 7 does not contain the entry and the IP address cannot be solved (S609), the communication control unit 2 transmits an error response to sip: TARO@test.com, namely, the originator communication terminal 1 (S610). On the other hand, if the position information table 7 contains the entry and the IP address can be solved at S608 (S609), the communication control unit 2 transmits the message to the IP address corresponding to sip: JIRO@test.com (IP address obtained at S608), namely, the receipt party communication terminal 1 (S611).

Figure 7:
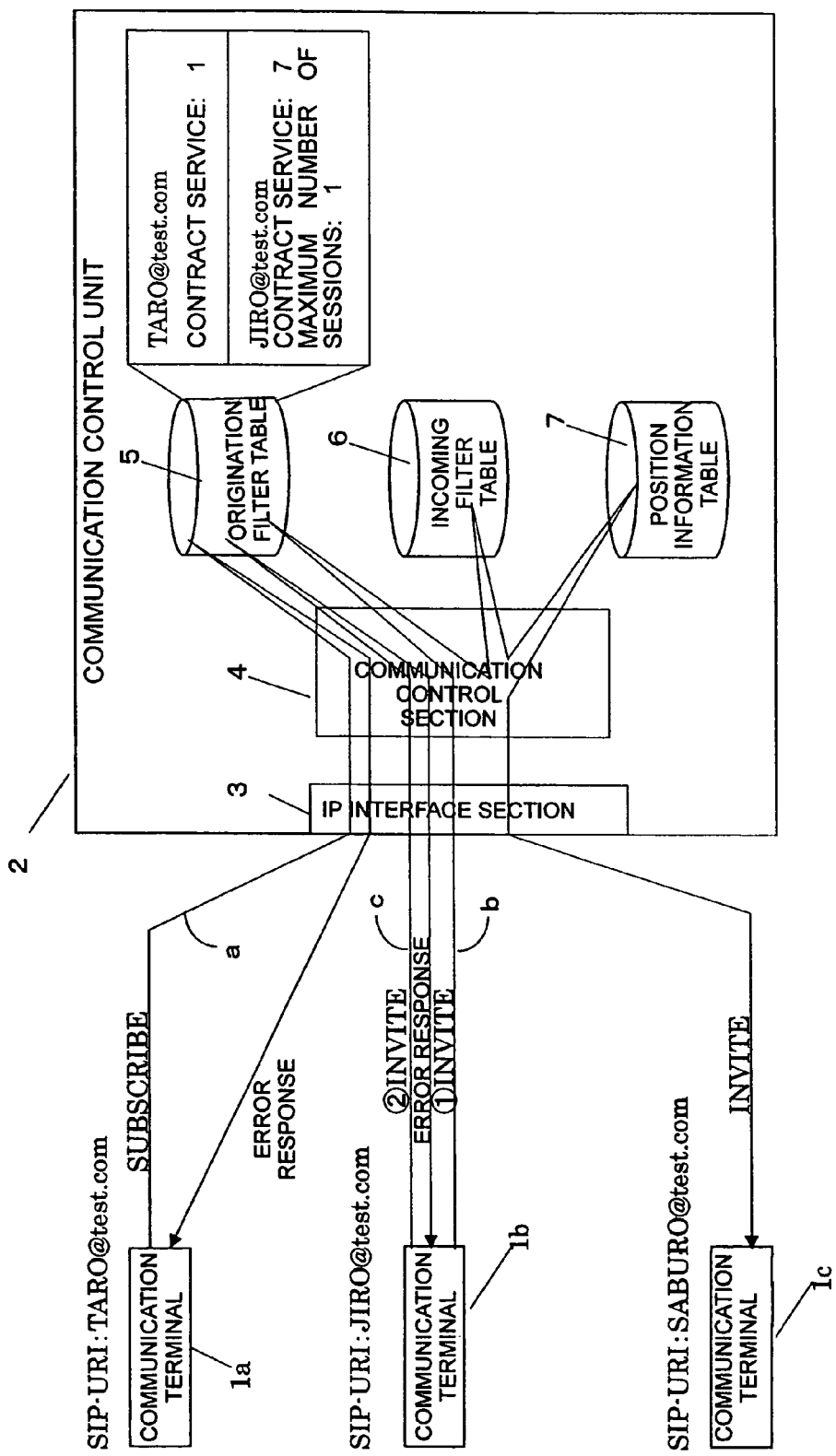
FIG. 7 is a drawing to show an operation example of origination filtering.

FIG. 7 is a drawing to show an operation example of origination filtering. An example of processing from reception of a message to origination filtering of the message will be discussed with reference to FIG. 7.

It is assumed that the origination filter table 5 stores information indicating that the user whose SIR-URI is TARO@test.com can use only the VoIP service because the contract service: 1, namely, "001" in binary notification and that the user whose SIR-URI is JIRO@test.com can use all services because the contract service: 7, namely, "111" in binary notification and the maximum number of sessions: 1, namely, the maximum number of sessions that can be activated at a time is 1. For convenience of the description, nothing is set for incoming filtering.

For example, if a SUBSCRIBE message is transmitted from the communication terminal 1a of the user whose SIR-URI is TARO@test.com to any desired user communication terminal 1 to use the presence service, the contract service information corresponding to the originator identifier (TARO@test.com) in the origination filter table 5 indicates that only the VoIP service can be used and therefore the message is subjected to origination filtering and an error response is returned to the communication terminal 1a (FIG. 7a).

If an INVITE message, for example, is transmitted from the communication terminal 1b of the user whose SIR-URI is JIRO@test.com to the communication terminal 1c of the user whose SIR-URI is SABURO@test.com in a state in which a session is not activated in the communication terminal 1b, the contract service information corresponding to the originator identifier (JIRO@test.com) in the origination filter table 5 indicates that all services can be used and therefore a session is activated and the INVITE message is normally transmitted to the communication terminal 1c of the user whose SIR-URI is SABURO@test.com (FIG. 7b).

If an INVITE message, for example, is further transmitted from the communication terminal 1b of the user whose SIR-URI is JIRO@test.com to any other communication terminal 1 than SABURO@test.com before the session is released, the maximum number of sessions corresponding to the originator identifier (JIRO@test.com) in the origination filter table 5 is 1 and therefore an additional session cannot be activated and thus the INVITE message is subjected to origination filtering and an error response is returned to the communication terminal 1b (FIG. 7c).

Thus, according to the origination filtering, service providing can be enabled or disabled and the number of sessions can be limited. One of the features of the embodiment is that the number of simultaneous sessions peculiar to the SIP can be limited.

Figure 8:
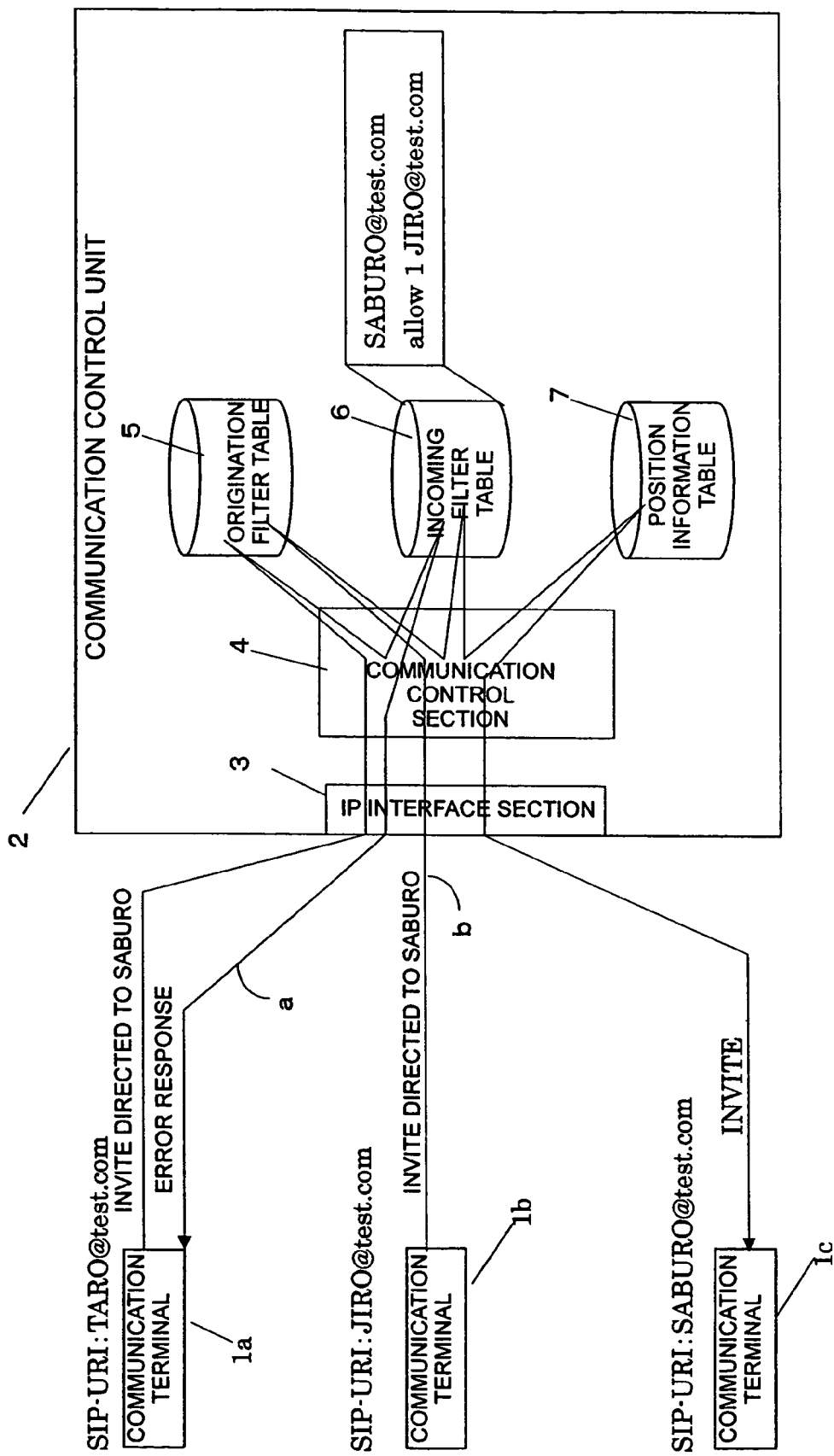
FIG. 8 is a drawing to show an operation example of incoming filtering.

FIG. 8 is a drawing to show an operation example of incoming filtering. An example of processing from reception of a message to incoming filtering of the message will be discussed with reference to FIG. 8. It is assumed that the incoming filter table 6 stores an entry indicating that the user whose SIR-URI is SABURO@test.com enables incoming of messages only from the user whose SIR-URI is JIRO@test.com and refuses incoming from other users. Although origination filtering processing is performed before incoming filtering processing is performed as described above, it is assumed that there is no entry involved in origination filtering in the following processing flow for convenience of the description.

When an INVITE message is transmitted from the communication terminal 1a of the user whose SIR-URI is TARO@test.com to the communication terminal 1c of the user whose SIR-URI is SABURO@test.com, origination filtering is not performed. However, TARO@test.com is not registered in the incoming filter table 6 as the originator from whom SABURO@test.com enables (allows) incoming and therefore the message is subjected to incoming filtering and an error response is returned to the communication terminal 1a (FIG. 8a).

On the other hand, when an INVITE message is transmitted from the communication terminal 1b of the user whose SIR-URI is JIRO@test.com to the communication terminal 1c of the user whose SIR-URI is SABURO@test.com, origination filtering is not performed. JIRO@test.com is registered in the incoming filter table 6 as the originator from whom SABURO@test.com enables (allows) incoming and therefore the message is not subjected to incoming filtering either. Thus, the INVITE message is normally transmitted to the communication terminal 1c of the user whose SIR-URI is SABURO@test.com (FIG. 8b).

If the incoming filter table 6 is set as in the assumption, a message from any other user than JIRO@test.com is subjected to incoming filtering like TARO@test.com described above and an error response is returned.

Figure 9:
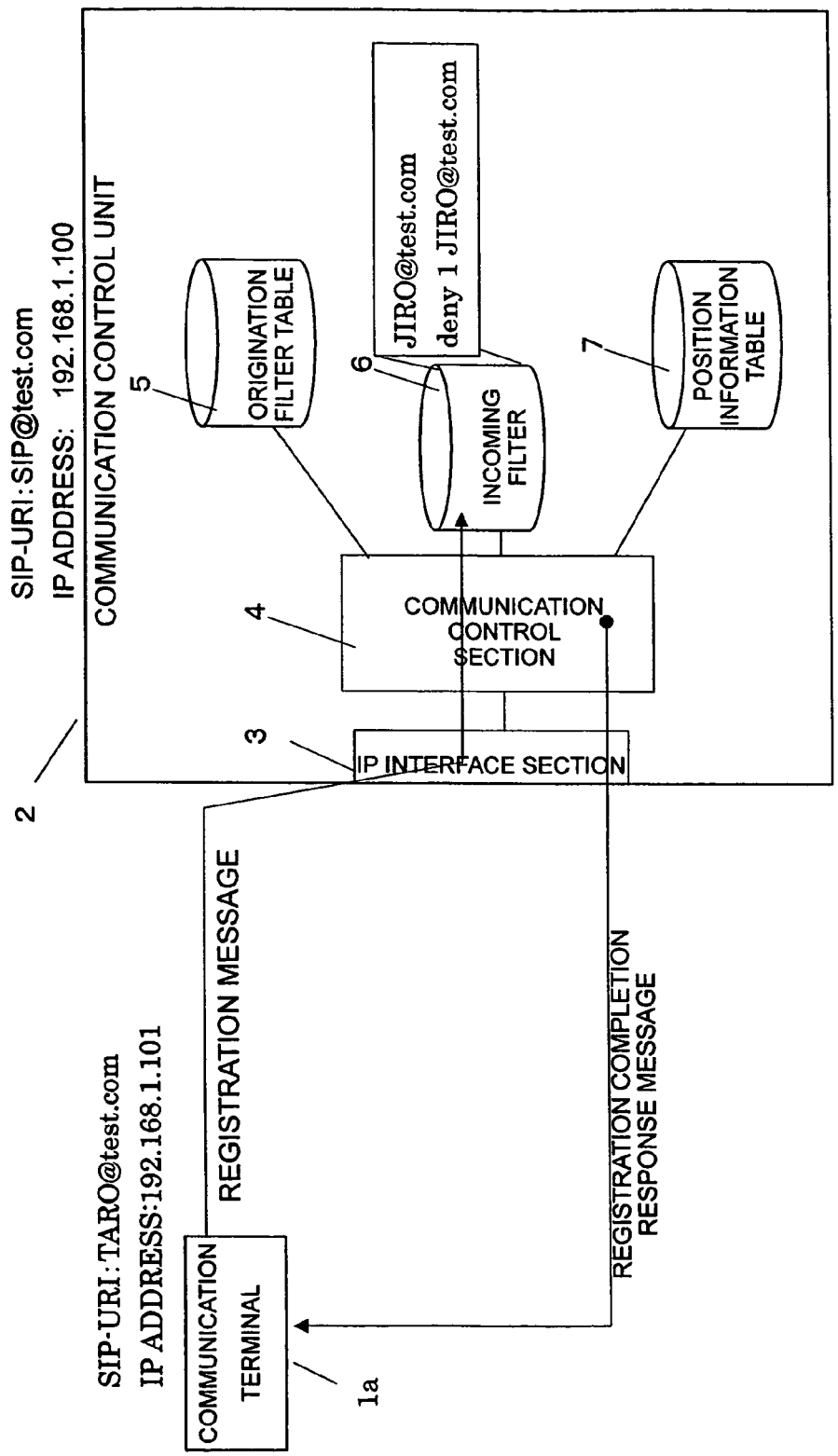
FIG. 9 is a schematic representation for registering an entry in the incoming filter table from an end user terminal.
Figure 10:
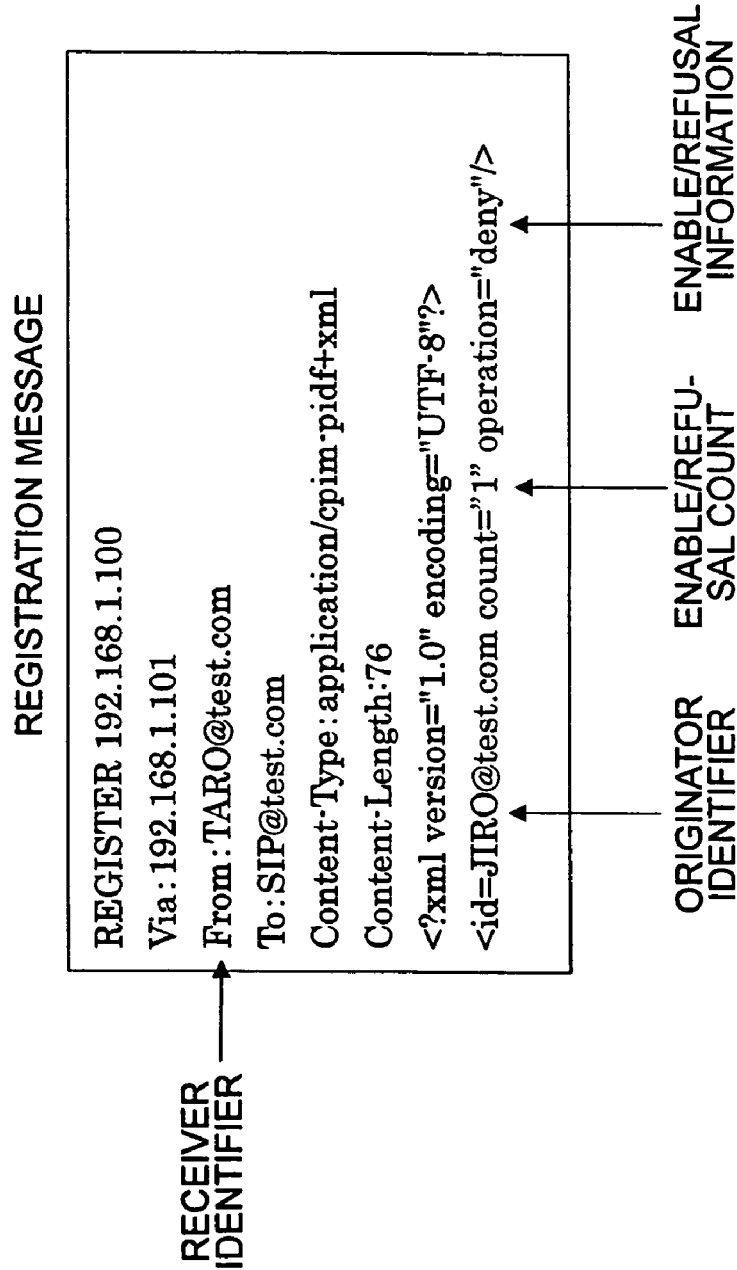
FIG. 10 is a drawing to show an example of a registration message.

FIG. 9 is a schematic representation of processing of registering an entry in the incoming filter table 6 from the communication terminal 1. FIG. 10 is a drawing to show an example of a REGISTER message transmitted from the communication terminal 1. In the embodiment, a REGISTER message is transmitted from the communication terminal 1 for registering, changing, etc., data in the incoming filter table 6.

In the body section of the message, enable/refusal information, enable/refusal count N, originator SIP-URI-1, . . . originator SIP-URI-N are described in XML (extensible markup language) format as shown in the REGISTER message in FIG. 10, for example.

When the processing routine section 9 of the communication control section 4 references the message and recognizes that the message is a REGISTER message, the processing routine section 9 transmits the message to the incoming filter management section 11. The incoming filter management section 11 has a function of analyzing a message in the XML format and registering data in the incoming filter table 6. In the example of the XML statement shown in FIG. 9, the incoming filter management section 11 registers entries of receiver identifier: "TARO@test.com," enable/refusal: "deny," enable/refusal count: "1," and originator identifier 1: "JIRO@test.com" in the incoming filter table 6.

If the entry of the receiver identifier to be registered is already registered, the analyzed enable/refusal count may be added to the enable/refusal count entry and originator identifier may be added. If the enable/refusal information is contrary as the enable/refusal information of the entry of the same receiver identifier already registered indicates "allow" and the analyzed enable/refusal information indicates "deny," the entry of either "allow" or "deny" may be registered and the other may be deleted. In addition to addition registration, likewise entry deletion and change are also possible.

If the registration is successful, the communication control section 4 creates a response message, for example, 200 OK and returns the message to the communication terminal 1. If the XML is invalid, the communication control section 4 returns an error message, for example, 400 Bad Request.

The invention can be used for industries involved in interactive communications between communication terminals in conformity with the Internet protocol, which are connected to a LAN to form an IP network.

What is claimed is:

1. A communication control unit using SIP (Session Initiation Protocol) as a protocol in an IP network where a plurality of communication terminals are connected for controlling a session of interactive communications between the plurality of communication terminals provided for a plurality of origination users and providing a plurality of services by the communication control unit for the origination users, said communication control unit comprising:

an origination filter table including pre-stored contract service information indicating whether or not each origination user can use each of the plurality of services and information of a maximum number of sessions that can be established by each of the origination users, corresponding to each originator SIP-URI (SIP-Uniform Resource Identifier) to identify each origination user, wherein the information of the maximum number of sessions is based on the contract service information for each of the origination users, an incoming filter table including pre-stored incoming enable/refusal information indicating whether an incoming request for a session from one of the origination users is enabled or refused and one or a plurality of originator SIP-URI(s) to identify the origination user for whom the incoming request is enabled or refused in accordance with the incoming enable/refusal information, corresponding to a receiver SIP-URI to identify an incoming origination user;

a position information table storing address information of the destination communication terminal corresponding to each receiver SIP-URI; and a communication control section for referencing said origination filter table and said incoming filter table, and filtering a message received from each communication terminal, wherein said communication control section:

receives a message including the originator SIP-URI, the receiver SIP-URI, and service type information responsive to the used service from one of the communication terminals, references said origination filter table based on the originator SIP-URI included in the received message, determines whether or not the origination user can use the service indicated by the service type information included in the message in accordance with the contract service information corresponding to the originator SIP-URI, and compares between the information of the maximum number of sessions corresponding to the originator SIP-URI and the number of sessions already established by the origination user to determine whether or not a new session can be established, references said incoming filter table based on the receiver SIP-URI and the originator SIP-URI included in the received message, and determines whether or not the incoming request from the origination user to the receiver is enabled in accordance with the incoming enable/refusal information corresponding to the receiver SIP-URI and the originator SIP-URI, references said position information table based on the receiver SIP-URI included in the received message, and acquires the address information corresponding to the receiver SIP-URI, and transmits the received message to the communication terminal of the receiver based on the acquired address information or discards the received message, in accordance with the determination results as to whether the service can be used or not, a new session can be established or not, and the incoming request is enabled or not.

2. The communication control unit as claimed in claim 1, wherein said communication control section receives a registration request message including the receiver SIP-URI, incoming enable/refusal information, and one or a plurality of the originator SIP-URI(s), transmitted from one of the communication terminals, and newly registers the receiver SIP-URI, incoming enable/refusal information, and one or a plurality of the originator SIP-URIs extracted by analyzing the received message in said incoming filter table, or, additionally registers the one or a plurality of the extracted originator SIP-URI(s) in an entry where the receiver SIP-URI and the incoming enable/refusal information are matched.

3. The communication control unit as claimed in claim 1 wherein the plurality of services provided by said communication control unit include one or a plurality of Internet telephone service or VoIP service, presence service, and instant message service, and wherein the service type is any of INVITE, SUBSCRIBE, or MESSAGE corresponding to the plurality of services, included in a Request-URI of a message header.

4. The communication control unit as claimed in claim 1 wherein filtering an INVITE message, a SUBSCRIBE message, or a MESSAGE message is equivalent to filtering the whole of the service corresponding to the message.

5. A filtering method in a communication control unit using SIP (Session Initiation Protocol) as a protocol in an IP network where a plurality of communication terminals are connected for controlling a session of interactive communications between the plurality of communication terminals provided for a plurality of origination users and providing a plurality of services by the communication control unit for the origination users, said filtering method including:

receiving a message including an originator SIP-URI (SIP-Uniform Resource Identifier) for at least one of the origination users, a receiver SIP-URI, and service type information responsive to a used service from one of the communication terminals, referencing an origination filter table including pre-stored contract service information indicating whether or not each origination user can use each of the plurality of services and information of a maximum number of sessions that can be established by the origination user, corresponding to each originator SIP-URI to identify an origination user based on the originator SIP-URI included in the received message, determining whether or not the origination user can use the service indicated by the service type information included in the message in accordance with the contract service information corresponding to the originator SIP-URI, and comparing between the information of the maximum number of sessions corresponding to the originator SIP-URI and the number of sessions already established by the origination user to determine whether or not a new session can be established for the origination user, wherein the information of the maximum number of sessions is based on the contract service information for each of the origination users, referencing an incoming filter table including pre-stored incoming enable/refusal information indicating whether an incoming request for a session from one of the origination users is enabled or refused and one or a plurality of originator SIP-URI to identify the origination user for whom the incoming request is enabled or refused in accordance with the incoming enable/refusal information, corresponding to each receiver SIP-URI to identify an incoming origination user based on the receiver SIP-URI and the originator SIP-URI included in the received message, and determining whether or not incoming from the origination user to the receiver is enabled in accordance with the incoming enable/refusal information corresponding to the receiver SIP-URI and the originator SIP-URI, referencing a position information table storing address information of the destination communication terminal corresponding to each receiver SIP-URI based on the receiver SIP-URI included in the received message, and acquires the address information corresponding to the receiver SIP-URI, and transmitting the received message to the communication terminal of the receiver based on the acquired address information or discarding the message, in accordance with the determination results as to whether the service can be used or not, a new session can be established or not, and the incoming is enabled or not.

6. A filtering method as claimed in claim 5 further includes:

receiving a registration request message including the receiver SIP-URI, incoming enable/refusal information, and one or a plurality of the originator SIP-URI(S), transmitted from one of the communication terminals, and newly registering the receiver SIP-URI, incoming enable/refusal information, and one or a plurality of the originator SIP-URIs extracted by analyzing the received message in said incoming filter table, or, additionally registering the one or a plurality of the extracted originator SIP-URI(s) in an entry where the receiver SIP-URI and the incoming enable/refusal information are matched.

7. A filtering method as claimed in claim 5 wherein the plurality of services provided by said communication control unit include one or a plurality of Internet telephone service or VoIP service, presence service, and instant message service, and wherein the service type is any of INVITE, SUBSCRIBE, or MESSAGE corresponding to the plurality of services, included in Request-URI of a message header.

8. A filtering method as claimed in claim 5 wherein filtering an INVITE message, a SUBSCRIBE message, or a MESSAGE message is equivalent to filtering the whole of the service corresponding to the message.

9. A communication control unit according to claim 1, wherein the communication control unit is configured so that a request for a session by one of the origination unit users is first compared with the contract service information and the information of a maximum number of session stored in the origination filter table before being compared with information stored in the incoming filter table to thereby decrease an overall filtering load on the communication control unit by first determining eligibility of each of the origination users to request one of the plurality of services and discarding the request if eligibility is not established before comparing the request with information stored in the incoming filter table.

10. A method according to claim 5, wherein the step of referencing the origination filter table in response to an incoming request for a session by one of the origination users is performed before the step of referencing the incoming filter table to thereby reduce an overall filtering load on the communication control unit by first determining eligibility of the origination user requesting a session based on the stored contract service information and the information of a maximum number of sessions and discarding the request if eligibility is not established before comparing the request with the information stored in the incoming filter table.

* * * * *